(12) United States Patent
Mustafa et al.

(10) Patent No.: US 11,953,765 B2
(45) Date of Patent: Apr. 9, 2024

(54) SUPERLATTICE ELECTRO-OPTIC DEVICE INCLUDING RECONFIGURABLE OPTICAL ELEMENTS

(71) Applicant: Raytheon Company, Waltham, MA (US)

(72) Inventors: Jamal I. Mustafa, Goleta, CA (US); Justin Gordon Adams Wehner, Goleta, CA (US); Christopher R. Koontz, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 18/298,097

(22) Filed: Apr. 10, 2023

(65) Prior Publication Data

US 2023/0244096 A1 Aug. 3, 2023

Related U.S. Application Data

(62) Division of application No. 16/529,978, filed on Aug. 2, 2019, now Pat. No. 11,650,438.

(51) Int. Cl.
*G02F 1/017* (2006.01)
(52) U.S. Cl.
CPC .......... *G02F 1/017* (2013.01); *G02F 2203/11* (2013.01); *G02F 2203/52* (2013.01)
(58) Field of Classification Search
CPC ..... G02F 1/015–01791; G02F 2203/11; G02F 1/0018; G02F 1/01766; G02F 2203/52
See application file for complete search history.

(56) References Cited

U.S. PATENT DOCUMENTS

| | | | |
|---|---|---|---|
| 4,784,476 A | 11/1988 | Schulman et al. |
| 4,883,770 A | 11/1989 | Dohler et al. |
| 4,929,064 A | 5/1990 | Schubert |
| 5,113,283 A | 5/1992 | Sugawara |
| 5,212,585 A | 5/1993 | Ning |

(Continued)

FOREIGN PATENT DOCUMENTS

EP 0154504 A2 9/1985

OTHER PUBLICATIONS

Baker-Finch et al., "Near-infrared Free Carrier Absorption in Heavily Doped Silicon" Journal of Applied Physics; Aug. 14, 2014; vol. 116, Issue 6 (13 pages).

(Continued)

*Primary Examiner* — Christopher Stanford
*Assistant Examiner* — Journey F Sumlar
(74) *Attorney, Agent, or Firm* — CANTOR COLBURN LLP

(57) ABSTRACT

A method is provided for operating one or more one solid-state electro-optic device to provide an electrically switching shutter. The method includes forming an alternating stack of first semiconductor layers having a first dopant and second semiconductor layers having a second dopant to form at least one superlattice semiconductor device. The method further includes applying to the at least one superlattice semiconductor device a first voltage to induce a transparent state of the alternating stack such that light is transmitted through the alternating stack, and applying to the at least one superlattice semiconductor device a second voltage different from the first voltage to induce an opaque state of the alternating stack such that light is inhibited from passing through the alternating stack.

6 Claims, 15 Drawing Sheets

(56) References Cited

U.S. PATENT DOCUMENTS

| | | | |
|---|---|---|---|
| 5,877,825 | A | 3/1999 | Kotler |
| 6,483,094 | B1 | 11/2002 | Yahav et al. |
| 8,102,435 | B2 | 1/2012 | Castorina et al. |
| 9,305,948 | B2 | 4/2016 | Wehner et al. |
| 9,307,158 | B2 | 4/2016 | Gleason et al. |
| 9,363,447 | B2 | 6/2016 | Nayar et al. |
| 2004/0212724 | A1 | 10/2004 | Bawolek et al. |
| 2009/0268192 | A1 | 10/2009 | Koenck et al. |
| 2013/0099205 | A1 | 4/2013 | Liu et al. |
| 2016/0358773 | A1 | 12/2016 | Mears et al. |
| 2017/0329202 | A1 | 11/2017 | Haeri |

OTHER PUBLICATIONS

Dohler et al., "Electro-optical and opto-optical devices based on nipi doping superlattices" Superlattices and Microstructures vol. 8, No. 1 (Jan. 1990) pp. 49-58 [XP024203205].

Gulden et al., "Tunable Electroabsorption in Laterally Contacted High Contrast N-I-P-I Doping Superlattice Modulator" Institute of Electrical and Electronic Engineers, Conference on Lasers and Electro Optics (CLEO), vol. 12, May 10, 1992 (2 pages) [XP000351606].

International Search Report and Written Opinion for International Application No. PCT/US20/034809; Application Filing Date May 28, 2020; dated Aug. 19, 2020 (16 pages).

Levin et al., "Image and Depth from a Conventional Camera with a Coded Aperture" ACM transactions on graphics (TOG); Jul. 29, 2007;26(3) (9 pages).

Ritt et al., "Automatic Laser Glare Suppression in Electro-Optical Sensors" Sensors; Jan. 15, 2015; pp. 792-802.

SUPERLATTICE ELECTRO-OPTIC DEVICE INCLUDING RECONFIGURABLE OPTICAL ELEMENTS

CROSS-REFERENCE TO RELATED APPLICATIONS

This application is a division of U.S. application Ser. No. 16/529,978 filed Aug. 2, 2019, the disclosure of which is incorporated herein by reference in its entirety.

BACKGROUND

The present disclosure relates to electro-optics and, in particular, to solid-state electro-optic devices.

Electro-optical devices, such as infrared detectors, are useful for many applications, including imaging equipment, surveillance equipment, targeting equipment, and other types of civilian and/or military applications. Certain electro-optic devices also may implement mechanical shutters that selectively block light input and apertures that are mechanically adjusted to provide different aperture sizes based on the image application.

SUMMARY

According to another non-limiting embodiment of the present disclosure, a method is provided for operating one or more one solid-state electro-optic device to provide an electrically switching shutter. The method includes forming an alternating stack of first semiconductor layers having a first dopant and second semiconductor layers having a second dopant to form at least one superlattice semiconductor device. The method further includes applying to the at least one superlattice semiconductor device a first voltage to induce a transparent state of the alternating stack such that light is transmitted through the alternating stack, and applying to the at least one superlattice semiconductor device a second voltage different from the first voltage to induce an opaque state of the alternating stack such that light is inhibited from passing through the alternating stack.

According to another non-limiting embodiment of the present disclosure, a method is provided for operating at least one solid-state electro-optic device to provide an electrically variable aperture. The method comprises forming an alternating stack of first semiconductor layers having a first dopant and second semiconductor layers having a second dopant to form at least one superlattice semiconductor device. The method further comprises patterning the alternating stack of first semiconductor layers to define a first transparent transitioning region between a first pair of electrical connectors, and second transparent transitioning region between a second pair of electrical connectors. The method further comprises applying a first voltage to the first and second pairs of electrical connectors to induce a first optical state of the first and second transparent transitioning regions such that a first amount of light is transmitted through the alternating stack; and applying a second voltage to the first and second pairs of electrical connectors to induce a second optical state to the first transparent transitioning region, while maintaining the first state of the second transparent transitioning region such that a second amount of light different from the first amount is transmitted through the alternating stack.

According to another non-limiting embodiment of the present disclosure, a method is provided for operating at least one solid-state electro-optic device to provide a coded aperture. The method comprises forming a plurality of superlattice semiconductor devices on a wafer to define an optic grid. Each superlattice semiconductor device includes an alternating stack of first semiconductor layers having a first dopant and second semiconductor layers having a second dopant. The method further comprises applying different voltages to the superlattice semiconductor devices located at different positions of the optic grid to define a pattern of the coded aperture.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
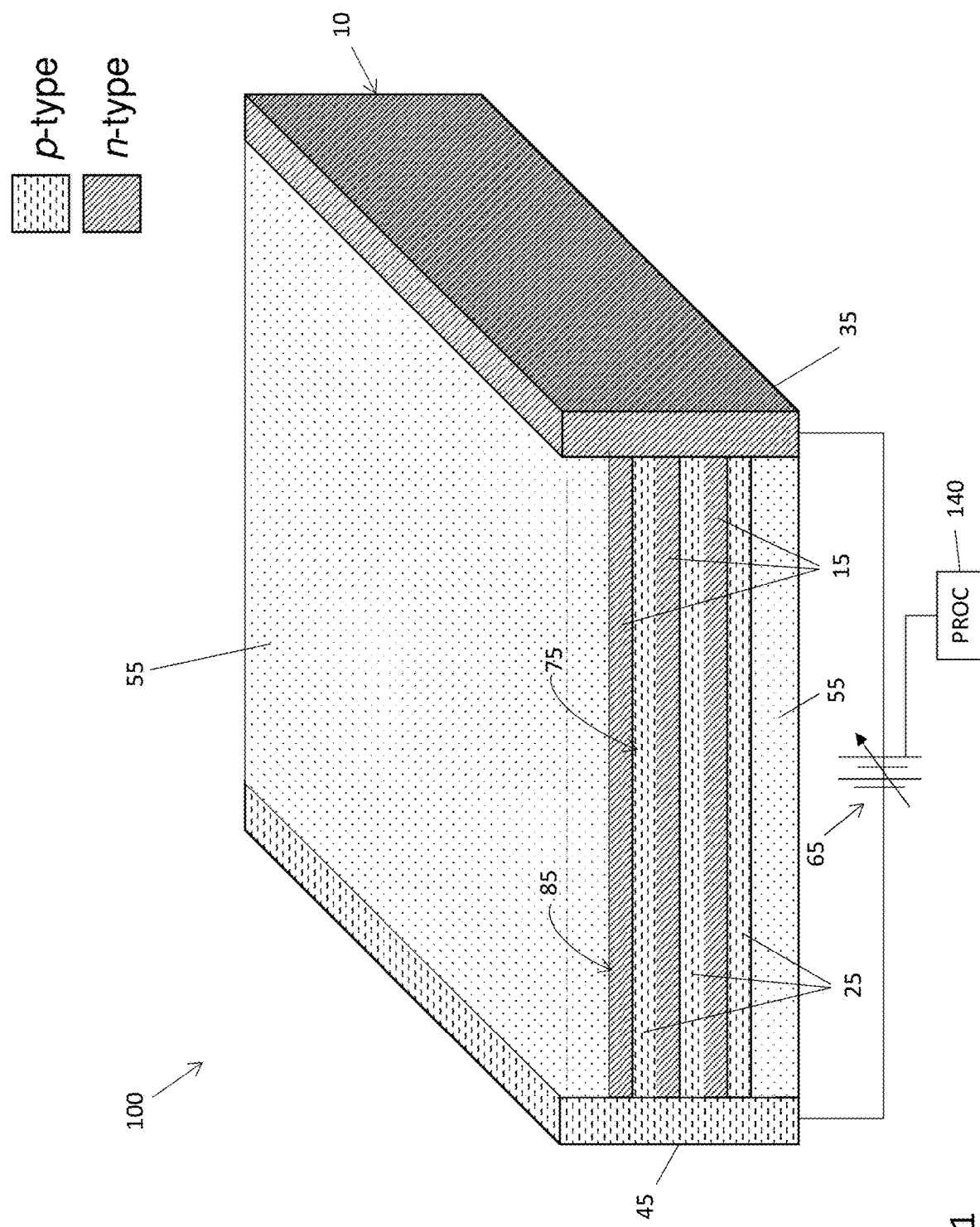
FIG. 1 is a perspective view of a solid-state electro-optic device according to a non-limiting embodiment.

Known mechanical optical devices, such as shutters and apertures, for example, have excessive size, weight, and power, and cost (SWaP-C) requirements that may not be ideal for large-scale projects and/or military applications. In addition, known mechanical optical devices typically have slow response times. For example, mechanical shutters have toggle speeds of about 1 second (s). These known mechanical optical devices also have very limited reconfiguration capabilities, especially in real-time due the restrictions of their mechanical components.

Various non-limiting embodiments described herein utilize solid-state electro-optic devices to overcome the limitations of known mechanical optical devices. For example, the solid-state electro-optic devices described herein are operated in various manners to provide different electro-optic devices including, but not limited to an electrically switchable shutter, an electrically variable aperture, a dynamic image filter, a neutral density filter, an image modulator, a polarizer, for application in fields such as an image processing.

In one or more embodiments, the solid-state electro-optic device is constructed as a superlattice semiconductor structure having a plurality of doped semiconductor material layers (sometimes referred to as a NIPI superlattice structure) to provide a region capable of transitioning between a substantially transparent state and a substantially opaque state. The solid-state electro-optic device can be transitioned between the substantially transparent state and the substantially opaque state in about 1 millisecond (ms) or less. In addition, the solid-electro-optic devices described herein can operate in cryogenic or extremely low-temperature environments (e.g., less than about −180° C. (−292° F.; 93 K), thereby making them available for orbital satellite applications or low-temperature environments.

For the sake of brevity, conventional techniques related to semiconductor device or integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

By way of background, however, a more general description of the semiconductor device fabrication processes that can be utilized in implementing one or more embodiments of the present invention. Although specific fabrication operations used in implementing one or more embodiments of the present invention can be individually known, the described combination of operations and/or resulting structures of the present invention are unique.

Various processes can be used to form a semiconductor device described herein can fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes can be followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) can be employed to connect and isolate transistors and their components. Selective doping of various regions of the semiconductor substrate and/or elements allows the conductivity of the substrate and/or elements to be changed with the application of voltage. By creating structures of these various components, several (e.g., thousands, millions, etc.) of individual semiconductor devices (e.g., transistors) can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

Figure 2:
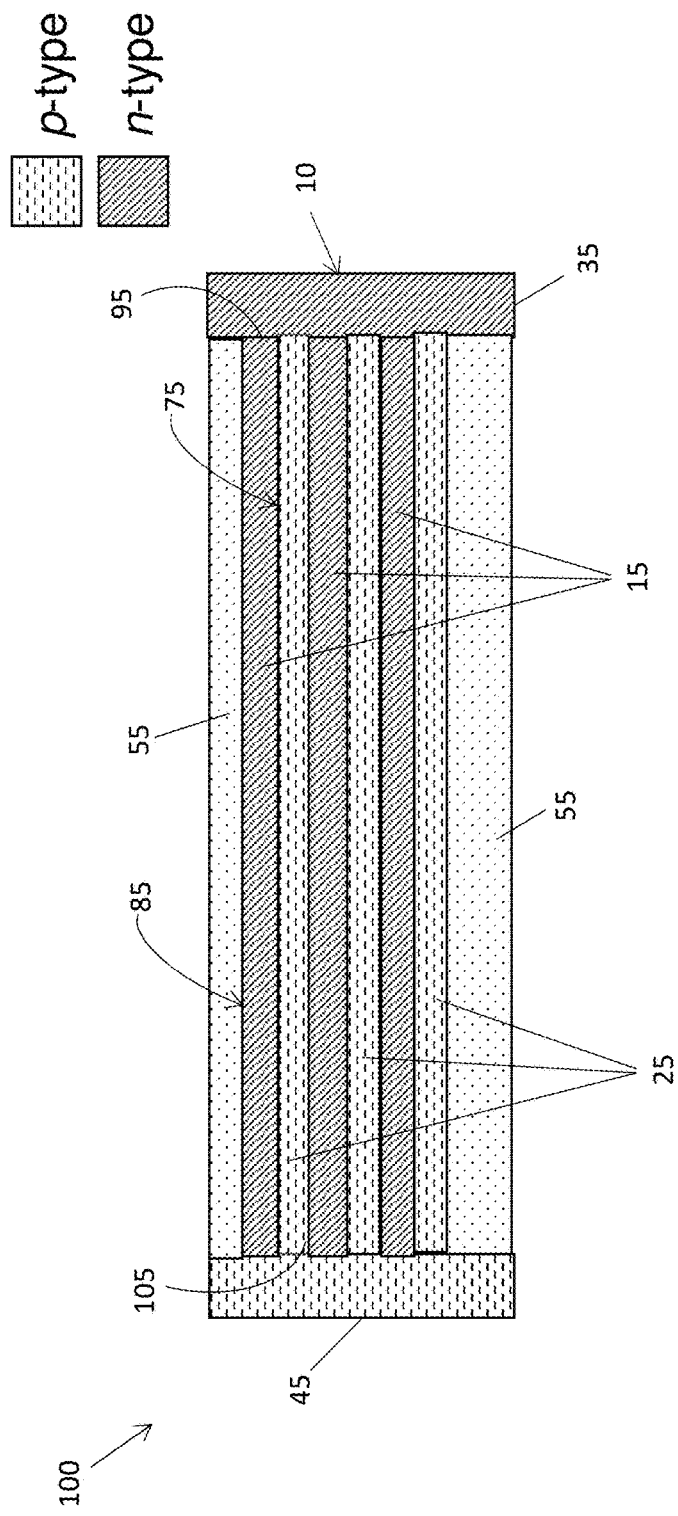
FIG. 2 is front view of the solid-state electro-optic device shown in FIG. 1 according to a non-limiting embodiment.

Turning now to FIGS. 1 and 2, a solid-state electro-optic device 100 is shown following various known fabrication techniques. The solid-state electro-optic device 100 is capable of variable light absorption and can be used to provide various electro-optic devices including, but not limited to an image shutter, an image filter, a neutral density filter, an image modulator, a polarizer, and an image processing. Applications and various methods of operations of associated with the solid-state electro-optic device 100 are described in greater detail below.

The solid-state electro-optic device 100 in the embodiment shown therein includes a superlattice semiconductor structure 10 having a plurality of doped semiconductor material layers. In one or more non-limiting embodiments, the semiconductor structure 10 includes a plurality of p-doped material layers 25 and a plurality of n-doped material layers 15. The layers 15 and 25 form an active region interposed between upper and lower portions of a substrate 55. FIGS. 1 and 2 show a top layer being an n-doped material layer 15 and the bottom layer being a p-doped material layer 25; however, the top and bottom layers may be reversed such that the top layer is a p-doped material layer 25 and the bottom layer is an n-doped material layer 15. In an exemplary embodiment, the n-doped material layers 15 are in physical contact with and in electrical connection with an adjacent p-doped material layer 25.

Alternative embodiments may include a transparent layer between adjacent pairs of n-type and p-type layers 15, 25.

The n-type layers 15 can include a semiconductor material doped with phosphorus (P) or arsenic (As), for example, while the p-type layers 25 can include a semiconductor material doped with boron (B) or gallium (Ga), for example. It should be appreciated that other dopants may be employed without departing from the scope of the invention. Exemplary embodiments of the semiconductor material include silicon (Si), germanium (Ge), silicon germanium (SiGe) gallium arsenide (GaAs), cadmium Telluride (CdTe), cadmium selenite (CdSe), or indium antimony (InSb). It should be noted that these teachings are not limited to those exemplary embodiments. In an exemplary embodiment, the semiconductor material is silicon. In one instance, the p-doped material and the n-doped material are heavily doped, have a doping density above $1.7 \times 10^{17}$ per cm$^3$ in some embodiments, and greater than $1.4 \times 10^{15}$ per cm$^3$ in many embodiments. It should be noted that these teachings are not limited only to those exemplary embodiments and that an entire range of doping density (also referred to as doping concentration) is within the range of these teachings. The thickness of each layer (the distance from the first side 75 to the second side 85) is between 5 nm and 200 nm, but these teachings are not limited to the thickness range.

In the embodiment of FIGS. 1 and 2, each layer 15, 25 has a first side 75 and an opposite second side 85. As shown in FIG. 1, a first side 75 (e.g., the bottom) of one n-type layer 15 is in contact with and electrically connected to a second side 85 (e.g., the top) of an adjacent p-type layer 25. Moreover, each layer 15, 25 has a first surface 95 extending between the first side 75 and the second side 85, and an opposite second surface 105 extending between the first side 75 and the second side 85. Each layer 15, 25 also has third and fourth surfaces (not shown) extending between the first side 75 and the second side 85, with the third and fourth surfaces being orthogonal to the first and second surfaces 95, 105.

A first electrical connector 35 is coupled to each layer of n-doped material 15 such that the connector 35 is connected resistively to their respective layers, but by a non-linear diode to the layers of the opposite type/contact. The layers of p-doped material 25 are not operatively electrically connected to the first electrical connector 35. Similarly, a second electrical connector 45 is coupled to each layer of p-doped material 25 such that the connector 45 is connected resistively to their respective layers, but by a non-linear diode to the layers of the opposite type/contact. The layers of n-doped material 15 are not operatively electrically connected to the second electrical connector 45. The first electrical connector 35 is in electrical contact with one of the surfaces of the layers of n-doped material 15, such as the first surface 95. The second electrical connector 45 is in electrical contact with one or more surfaces of the layers of p-doped material 25, such as the second surface 105. Accordingly, the layers are in contact with each of the connectors 35, 45, but a junction between layers and connectors 35, 45 of opposite types essentially breaks or prevents electrical contact.

The stack of layers 15, 25 is disposed on a lower portion of the substrate 55. A variety of materials can be used as a substrate. In some instances, the substrate material is selected based on transmissivity and index of refraction in the frequency range of interest. When the frequency range is in the infrared range of frequencies, some exemplary embodiments of substrates are silicon, germanium, and gallium arsenide. It should be noted that these teachings are not limited to those exemplary embodiments.

As shown in FIG. 1, a variable voltage source 65 is electrically connected between the first electrical connector 35 and the second electrical connector 45. The variable voltage source 65 is configured to provide reverse bias voltage between the layers of p-doped material 25 and the layers of n-doped material 15.

Embodiments of the variable voltage source 65 include a digital input variable DC voltage source and a DC source with a digital potentiometer. In some embodiments, a variable DC voltage source is implemented. In other embodiments, a variable AC voltage source can be implemented to actuate the solid-state devices at an increased actuation speed compared to those achieved using a variable DC voltage source. For embodiments of the solid-state electro-optic device 100 having a plurality of semiconductor structures 10, the same variable DC voltage source can be used for all or a portion of the semiconductor structures 10. The variable voltage source 65 may be controlled by a suitable processor 140, such as a microprocessor, microcontroller, logic circuit, Application-Specific Integrated Circuit (ASIC), Field-Programmable Gate Array (FPGA), or the like. The processor 140 may receive inputs from external sensors, as described below, and operate the variable voltage source 65 to cause one or more semiconductor structures 10 to become opaque or transparent to electromagnetic radiation, depending on the application. In one or more non-limiting embodiments, a given semiconductor structure 10 can be transitioned from a substantially opaque to a substantially transparent state in about 1 ms or less, thereby providing significantly improved toggle speeds compared to mechanical shutters.

In order to further elucidate these teachings, multiple embodiments are presented herein below. It should be noted that these teachings are not limited only to these exemplary embodiment. In one embodiment, the semiconductor structure 10 is tunable to enable or disable a predetermined range of frequencies, such as an infrared range of frequencies, to pass through. It should be noted that these teachings are not limited only to that embodiment and that other ranges of frequencies are within the scope of these teachings. In one instance, the predetermined range of frequencies includes a range of frequencies for electromagnetic radiation with wavelengths between 3 μm and 12 μm, and ranges within that range can also be used. It should be noted that that embodiments can have any number of structures and any of a number of possible geometrical shapes and is not only limited to the exemplary embodiment shown herein.

Figure 3A:
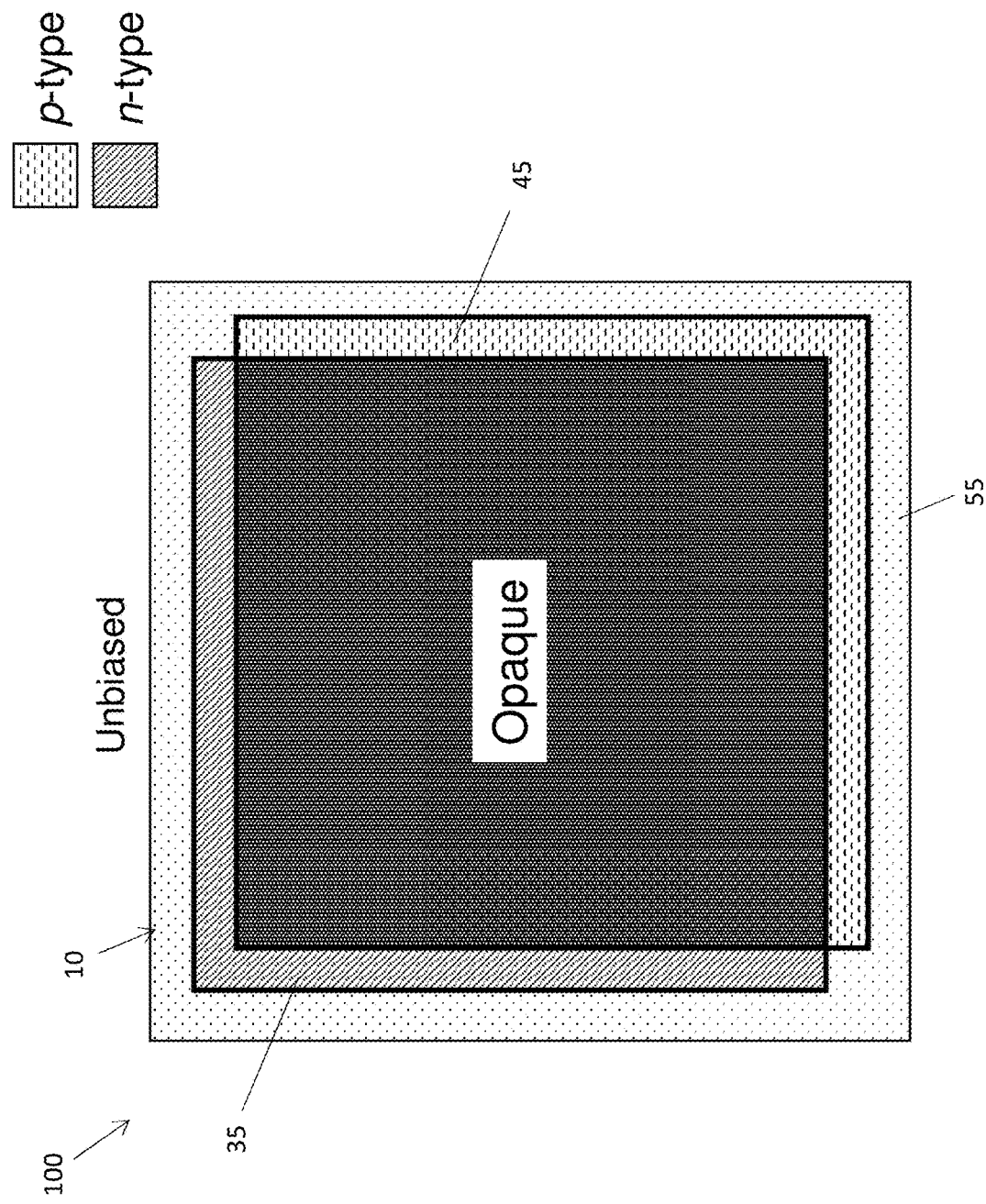
FIG. 3A is a top view of the solid-state electro-optic device shown in FIGS. 1 and 2 operating in a non-voltage biased state according to a non-limiting embodiment.
Figure 3B:
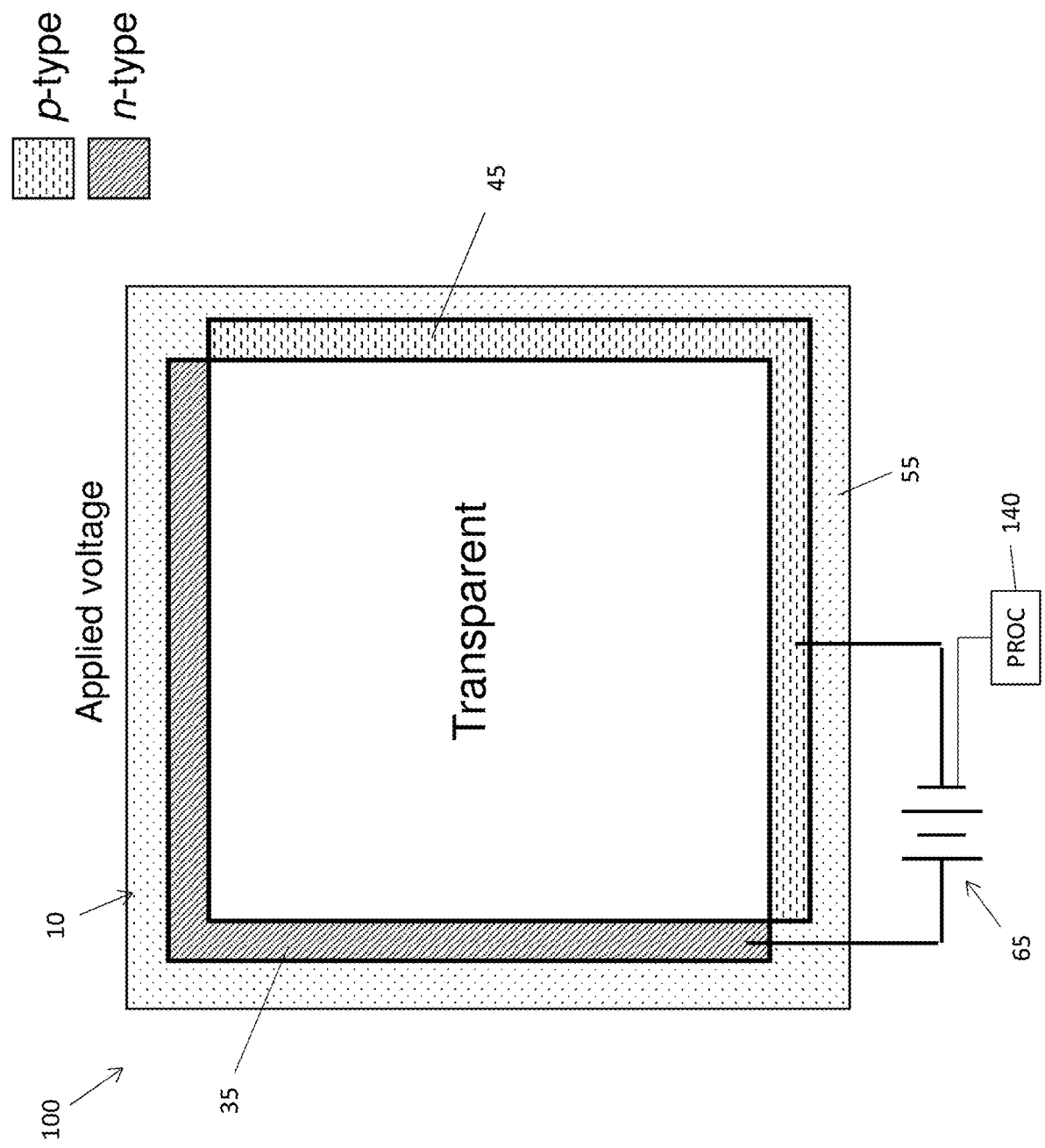
FIG. 3B depicts the solid-state electro-optic device shown in FIG. 3A when applying a voltage according to a non-limiting embodiment.

FIGS. 3A and 3B show a top view of the solid-state electro-optic device 100 described above. This embodiment can be used as an electrically switchable shutter upon detection of directed energy, such as a laser beam or solar flare that is incident or directed towards the solid-state electro-optic device 100. Known devices use filters to block narrow bands of laser energy, liquid crystal shutters to protect sensors, various opto-mechanical methods to redirect the laser energy, or passive nonlinear optics. Embodiments described herein, however, can be solid-state devices that sense electromagnetic radiation such as directed laser energy using a radiation detector and then use high-speed switching of the variable voltage source 65 to alter the transparency of the solid-state electro-optic device 100.

For example, the processor 140 can cause the variable voltage source 65 to alter the DC reverse bias voltage from a first reverse bias voltage corresponding to a maximum transmission of electromagnetic radiation allowable for the solid-state electro-optic device 100 to a second reverse bias voltage corresponding to a lowest transmission of electromagnetic radiation allowable for the solid-state electro-optic device 100. The threshold level of directed energy can be predetermined according to application (i.e., on the type of sensor being protected) or can depend on the materials making up the solid-state electro-optic device 100. Accordingly, one or more non-limiting embodiments described herein allow the solid-state electro-optic device 100 to operate as an electrically switchable shutter that, depending on the switching speed, can be part of a modulator or used as a filter. When the DC voltage is varied from the first reverse bias voltage to the second reverse bias voltage, the transmission coefficient of photons through the semiconductor material layers 15, 25 will vary from a lowest value to a maximum value as in a variable optical filter. In one instance, the second reverse bias voltage corresponding to a lowest transmission of electromagnetic radiation is zero. Although the solid-state electro-optic device 100 is shown as normally opaque (e.g., normally off), the invention is not limited thereto and can be controlled to operate as normally transparent (e.g., normally on).

As shown in FIG. 3B, the variable voltage source 65 has applied the first reverse bias voltage between the first and second electrical connectors 35 and 45 to enable the solid-state electro-optic device 100 to act as substantially transparent to electromagnetic radiation. Upon detection by a detector unit (not shown in FIGS. 3A and 3B) that directed energy, such as laser energy, is incident on the solid-state electro-optic device 100 above a threshold level, the processor 140 causes the variable voltage source 65 to switch from the first reverse bias voltage to the second bias voltage to render the solid-state electro-optic device 100 as substantially opaque to electromagnetic radiation, including the directed energy. Although FIG. 3A shows the solid-state electro-optic device 100 being substantially opaque, operation of the solid-state electro-optic device 100 is not limited thereto. For example, the applied voltage can be varied such that transparency is adjusted to any level between substantially transparent (see FIG. 3A) and substantially opaque (see FIG. 3B). Thus, the amount of light that passes through the solid-state electro-optic device 100 can be precisely controlled, e.g., can range from 0% of light that passes through the solid-state electro-optic device 100 when substantially opaque to 100% of the light that passes through the solid-state electro-optic device 100 when substantially transparent.

In one or more embodiments, an imaging system may employ a plurality of electro-optic devices 100, each being associated with a respective pixel of a focal plane array. In such an embodiment, the processor 140 (which may also operate as a detector unit) can determine one or more targeted electro-optic devices 100 or pixels that are receiving directed energy and/or whether the energy level is greater than a threshold level. The processor 140 can then cause the variable voltage source 65 to adjust the reverse bias voltage between the n-type and p-type material layers 15 and 25 to change the transmissivity of those targeted electro-optic devices 100 but not the remaining electro-optic devices 100 (i.e., those electro-optic devices 100 unaffected by energy or receiving energy with a level less than the threshold level).

Figure 4B:
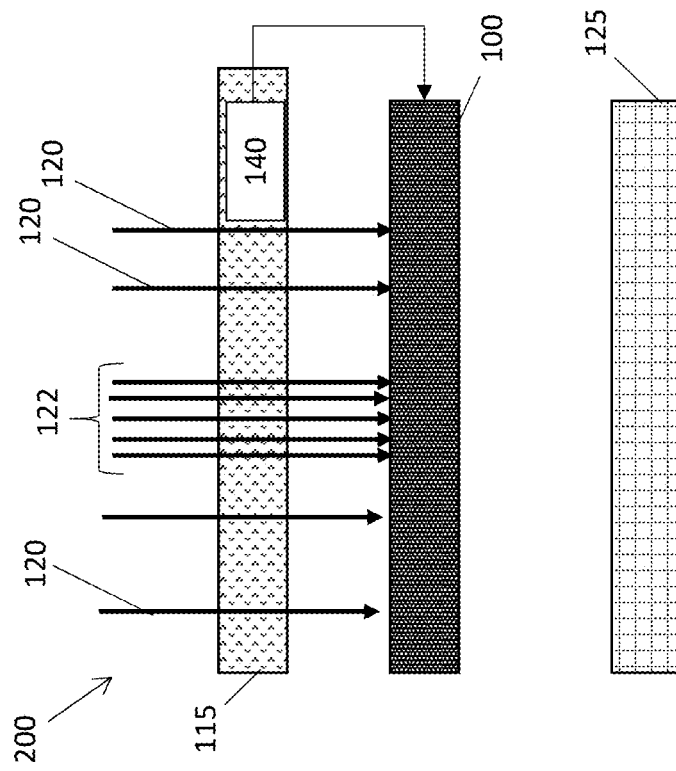
FIG. 4B depicts the solid-state electro-optic device of FIGS. 3A and 3B operating as an electrically switchable shutter operating in a second mode inhibiting light from passing therethrough according to a non-limiting embodiment.
Figure 4A:
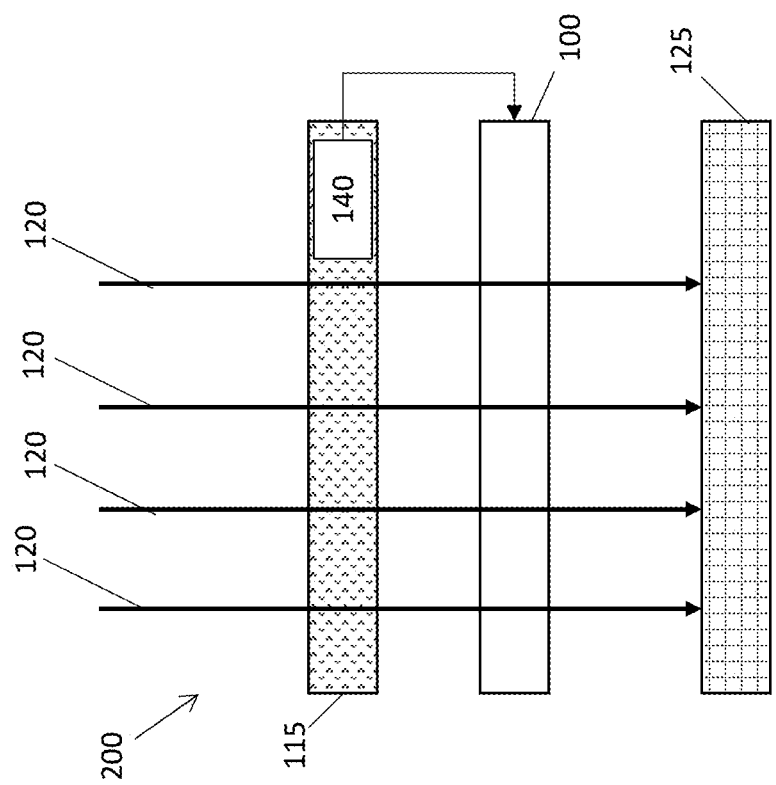
FIG. 4A depicts the solid-state electro-optic device of FIGS. 3A and 3B operating as an electrically switchable shutter operating in a first mode allowing light to pass therethrough according to a non-limiting embodiment.

Turning now to FIGS. 4A and 4B, the solid-state electro-optic device 100 is implemented in an imaging system 200 and is configured to operate as an electrically switchable shutter. When configured as an electrically switchable shutter, the solid-state electro-optic device 100 can selectively operate in a first mode to pass light to the image sensor 125, and a second mode to inhibit light or completely block from reaching the image sensor 125.

The imaging system 200 includes a detector unit 115, the solid-state electro-optic device 100, and an image pixel or image sensor 125. The detector unit 115 can be constructed, for example, as a bolometer or a pyroelectric detector. In one or more embodiments, the detector unit 115 can operate in conjunction with a read out integrated circuit (ROIC) capable of detecting incident light 120 and the intensity of the incident light 120. When it is desired to adjust the DC voltage upon receiving an output of the detector unit 115 that indicates an intensity higher than an intensity threshold, the detector unit 115 can also include a comparator for comparing to the predetermined intensity. The comparator can be configured in hardware or digitally configured.

As shown in FIG. 4A, light 120 is incident on the detector unit 115, which determines the light's intensity. When the intensity is below an intensity threshold, the processor 140 applies a voltage to the solid-state electro-optic device 100, thereby operating the solid-state electro-optic device 100 in a first mode. In this example, the first mode invokes a transparent state of the solid-state electro-optic device 100 (see FIG. 3B). Accordingly, the incident light 120 passes through the detector unit 115 along with the transparent layer(s) of the solid-state electro-optic device 100 such that it is delivered to the sensor 125.

As shown in FIG. 4B, the detector unit 115 can detect when the incident light has a light intensity that exceeds the intensity threshold. One example may include when high-intensity laser light 122 or a solar flare, for example, is received by the detector unit 115. In either case, the detector unit 115 communicates the presence of the excess energy level to the processor 140. In turn, the processor 140 adjusts the voltage delivered to the solid-state electro-optic device 100 thereby causing the solid-state electro-optic device 100 to become substantially opaque to all incident electromagnetic radiation (see FIG. 3A). In one or more embodiments, the processor controls the variable DC voltage source (not shown in FIGS. 4A and 4B) to apply the second reverse bias voltage. Accordingly, light is inhibited or completely blocked from passing through the solid-state electro-optic device 10, thereby protecting the sensor 125 from excessive temperatures and damage.

Although a single solid-state electro-optic device 100 is described above, it should be appreciated that a plurality of the solid-state electro-optic devices 100 can be implemented in an image system to provide a grid of electrically switchable shutters. The grid can have various dimension including one-dimension, two-dimensions, or three-dimensions, for example. The solid-state electro-optic device 100 can also be stacked in the optical direction. When implementing a plurality of the solid-state electro-optic devices 100, one or more non-limiting embodiments provides a method of operating each individual solid-state electro-optic devices 100 independently from one another.

Figure 5A:
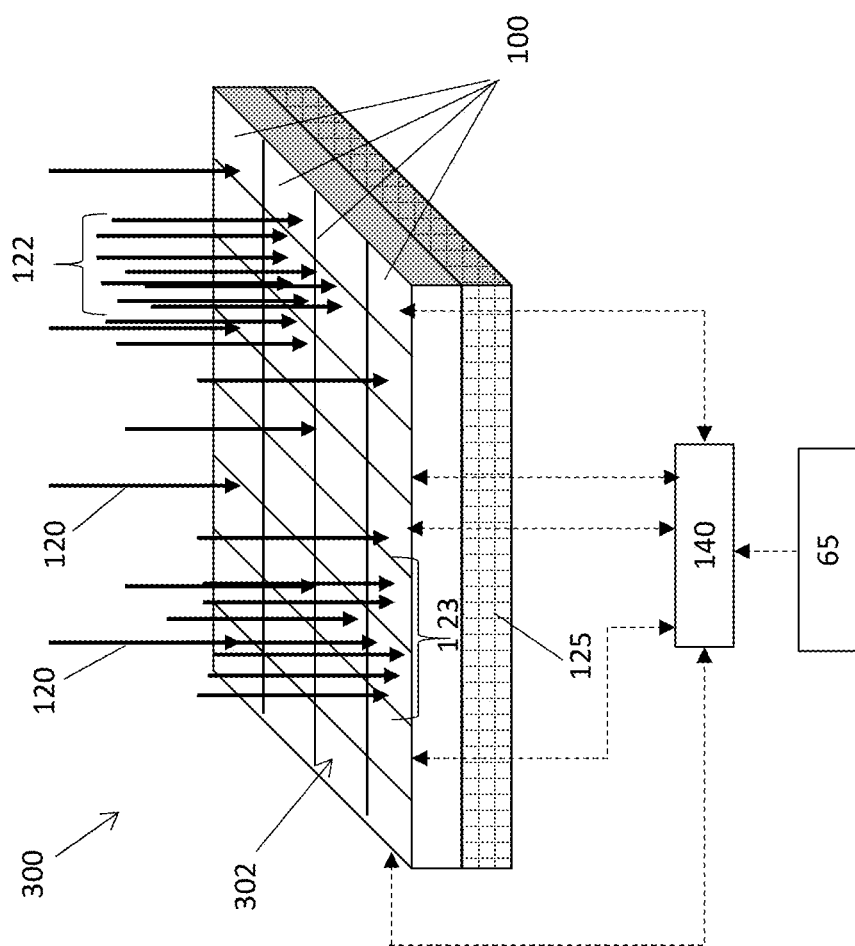
FIG. 5A illustrates a plurality of solid-state electro-optic devices arranged to form an optic grid according to a non-limiting embodiment.
Figure 5B:
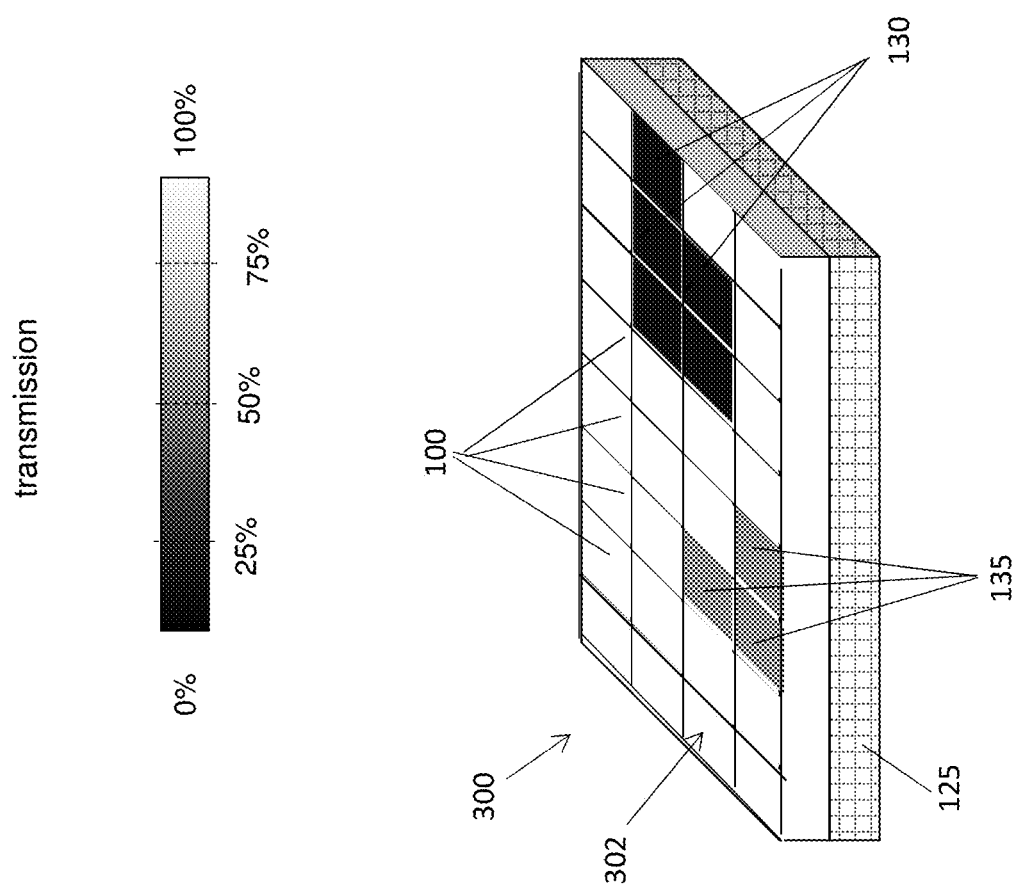
FIG. 5B illustrates the optic grid of FIG. 5A operating as a segmented shutter according to a non-limiting embodiment.
Figure 5C:
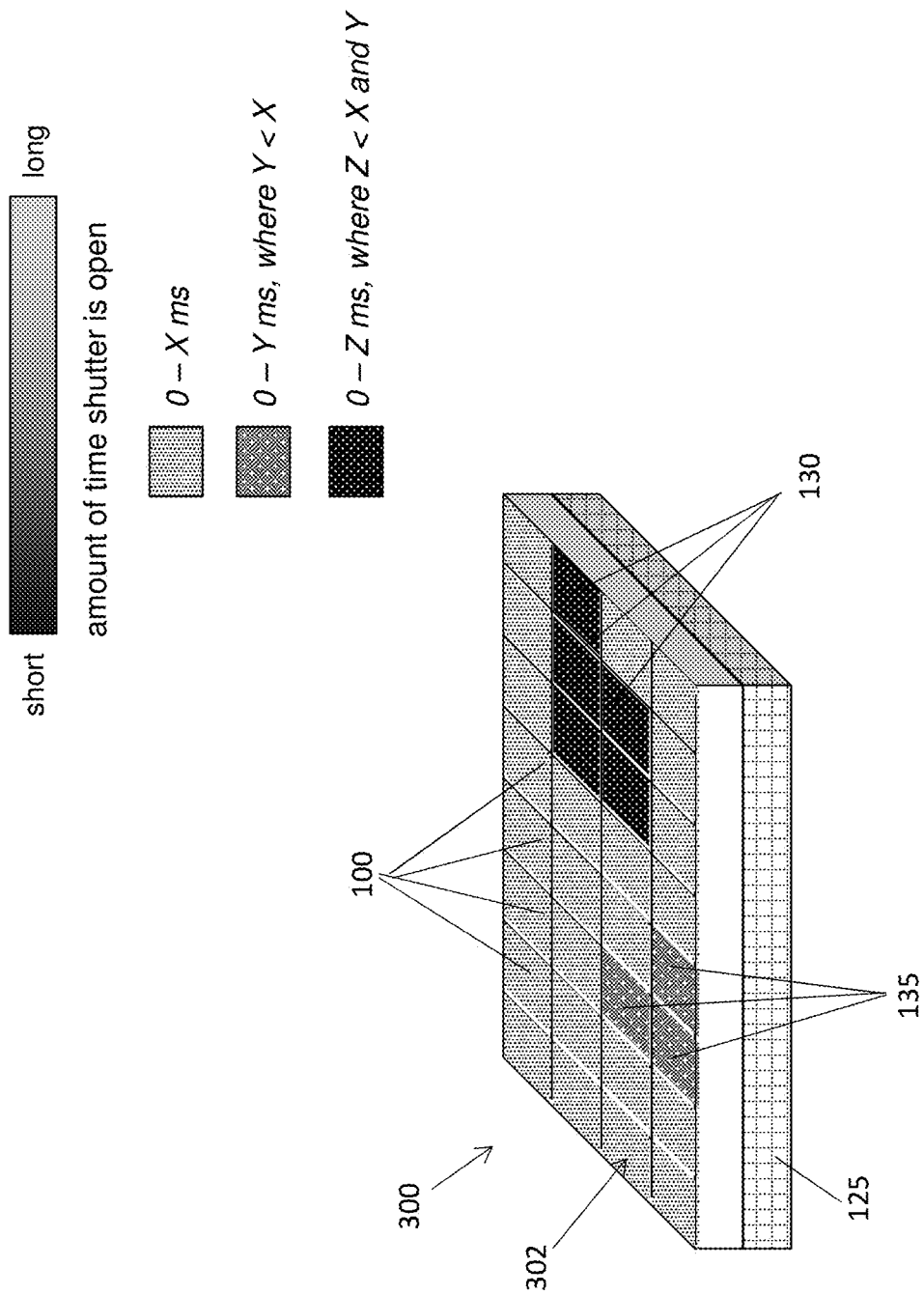
FIG. 5C illustrates the optic grid of FIG. 5C operating as a segmented shutter according to another-non-limiting embodiment.

Turning to FIGS. 5A, 5B and 5C, an image system 300 is illustrated including a plurality of individual solid-state electro-optic devices 100 is illustrated according to a non-limiting embodiment. The solid-state electro-optic devices 100 are arranged in in a plurality of columns and rows to form a grid 302 of electrically switchable shutters. In one or more embodiments, each solid-state electro-optic device 100 is connected to power source 65 via processor 140. Accordingly, processor 140 can control the level of voltage applied to each individual solid-state electro-optic device 100 independently from one another.

As shown in FIG. 5A, light is incident on the grid 302 of solid-state electro-optic devices 100 (to which one or more variable voltage sources 65 have applied the first reverse bias voltage). In this example, the light includes low-intensity light 120 having a first light intensity or energy level, moderate intensity light 123 having a second light intensity or energy level greater than that of low-intensity light 120, and high-intensity light 122 having a third light intensity or energy level greater than that of both the low-intensity 120 light and the moderate intensity light 123. I In the example illustrated in FIGS. 5A-5C, each solid-state electro-optic device 100 can be associated with a respective pixel, for example. As shown in FIG. 5B, for example, a detector unit (not shown in FIGS. 5A-5C) in signal communication with the processor 140 can detect when an energy level incident on one or more of the solid-state electro-optic devices 100 exceeds a threshold level or is high enough that a solid-state electro-optic device 100 may be saturated. It is known in the art that saturation of regions of a sensor reduces the ability of the sensor to detect light energy. In an embodiment, the solid-state electro-optic devices 100 themselves, or the focal plane array to which a group of solid-state electro-optic devices 100 belongs, communicate the saturation to the processor 140. Based on the determined saturation or light intensity realized by one or more solid-state electro-optic devices 100, the processor controls the output voltage generated by the variable voltage source 65. In one or more non-limiting embodiments, the processor 140 outputs a second reverse bias voltage to those solid-state electro-optic devices 100 realizing saturation or increased light intensity, thereby varying the transparency (e.g., reducing the transparency) of the solid-state electro-optic devices 100 associated with those pixels to reduce the amount of light transmission therethrough. Accordingly, a segmented shutter can be achieved.

FIG. 5B shows the transmission levels of the solid-state electro-optic devices 100 across the grid 302. In this example, a first plurality of solid-state electro-optic devices 100 is associated with a first plurality of pixels of the focal plane array and at least a second plurality of solid-state electro-optic devices 100 is associated with a second plurality of pixels. It can be seen from FIG. 5B that a region receiving the high-intensity light 122 corresponds with a first group 130 of solid-state electro-optic devices 100.

Accordingly, the processor 140 (see FIG. 5A) controls the voltage level applied to the first group 130 such that the first plurality of solid-state electro-optic devices 130 are substantially opaque. In this manner, about 0% of the high-intensity light 122 is transmitted through the first plurality solid-state electro-optic devices 100 to avoid saturation of their associated pixels. In one or more embodiments 0 volts or substantially 0 volts is applied to the first group 130 of solid-state electro-optic devices 100 to achieve the opaque or substantially opaque state. The transmissivity of a solid-state elector-optic devices 130 can vary between 0% and 100% as a function of wavelength.

Similarly, a region receiving the moderate intensity of light 123 corresponds with a second group 135 of solid-state electro-optic devices 100. Accordingly, the processor 140 (see FIG. 5A) applies a different voltage level (e.g., increased voltage level) to the second group 135 independent from the first group such that the second plurality of solid-state electro-optic devices 135 such that their transparency level is between completely transparent and opaque to electromagnetic energy. In this manner, about 50% of the moderate light 123, for example, is transmitted through the second plurality solid-state electro-optic devices 135. This allows the second plurality solid-state electro-optic devices 135 to operate as individual neutral density filters such that their associated pixels still receive some light without becoming damaged or saturated.

In another example illustrated in FIG. 5C, the amount of time at which one or more individual solid-state electro-optic devices 100 is substantially opaque differs across the grid 302 of solid-state electro-optic devices 100. For example, a first plurality of solid-state electro-optic devices 100 is associated with a first plurality of pixels of the focal plane array, a second plurality of solid-state electro-optic devices 135 is associated with a second plurality of pixels, and a third plurality of solid-state electro-optic devices 130 is associated with a third plurality of pixels. It can be seen from FIG. 5A that the first group 100 receives low-intensity light, while the second group 135 is located in a region receiving moderate-intensity light 123 and the third group 130 is located in a region receiving high-intensity light 122.

In an example where the individual solid-state electro-optic devices 100, 130 and 135 are biased normally "opaque" (e.g., no voltage is applied), the processor 140 (see FIG. 5A) applies voltage to the first group receiving the low-intensity light 120 such that the first plurality of solid-state electro-optic devices 100 are substantially transparent for a first time period (e.g., 0-X ms). For the second group receiving the moderate-intensity light 123, the processor 140 (see FIG. 5A) applies voltage such that the second plurality of solid-state electro-optic devices 135 are substantially transparent for a second time period (e.g., 0-Y ms, where Y<X). For the third group receiving the high-intensity light 122, the processor 140 (see FIG. 5A) applies voltage such that the third plurality of solid-state electro-optic devices 130 are substantially transparent for a third time period (e.g., 0-Z ms, where Z<X and Y). Although the shutter times are described in terms of milliseconds, the shutter times are not limited thereto. It should be appreciated that faster or slower times may be implemented without departing from the scope of the invention. Accordingly, the shutter mechanism of the first group of solid-state electro-optic devices 100 receiving the lowest intensity light 120 is allowed to remain substantially transparent (e.g., open) longer than the shutter time of the third group of solid-state electro-optic devices 130 receiving the highest intensity light 122. In this manner, the pixels associated with the third group 130 are only briefly exposed to the high-intensity light 122 such that the pixels may still obtain a reading without becoming damaged. The ability to independently vary the shutter time of the individual solid-state electro-optic devices allows for increasing the dynamic range across the grid 300.

Figure 6A:
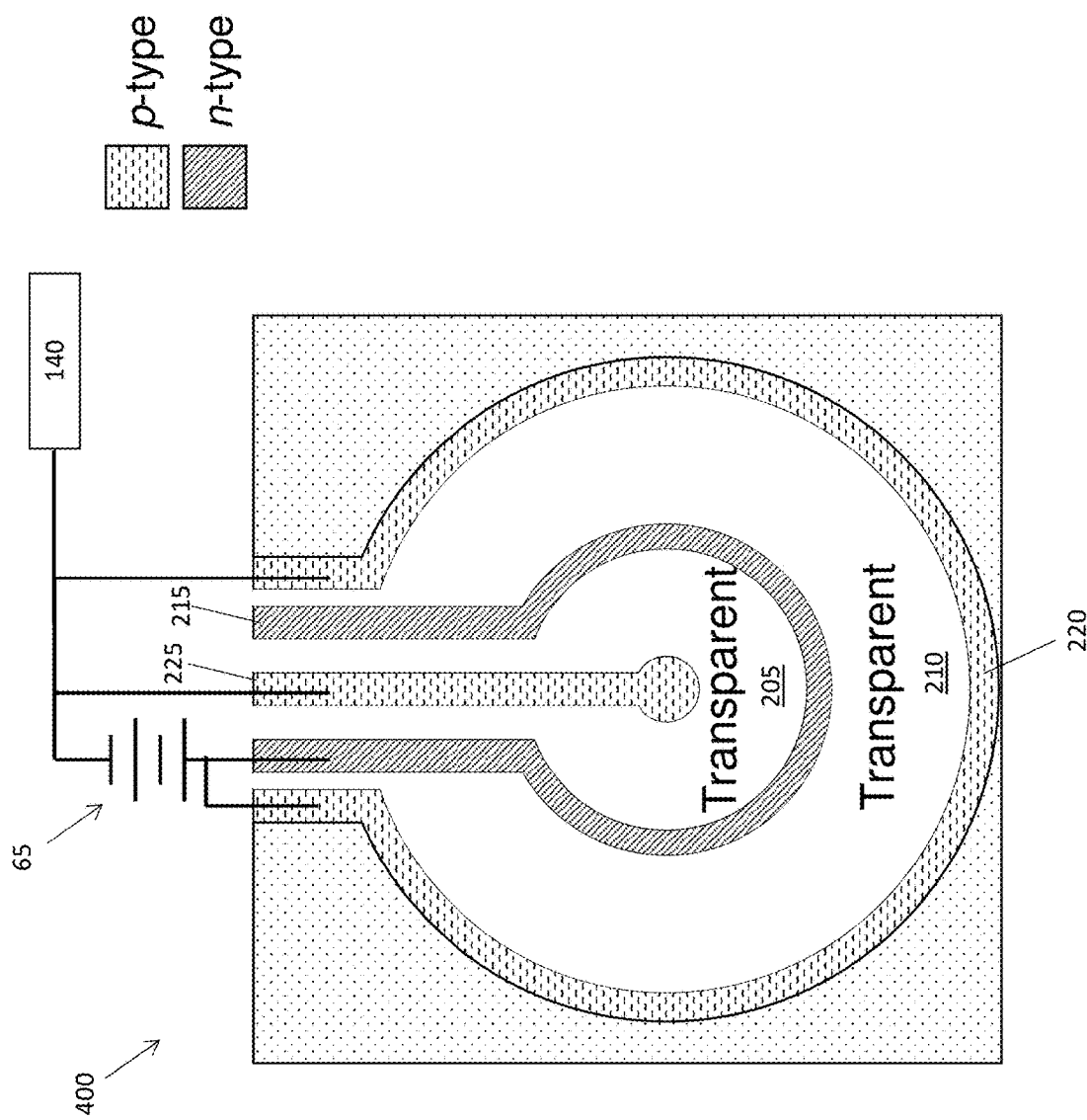
FIG. 6A is a top view of a solid-state electro-optic device operating as an aperture in a first state according to a non-limiting embodiment.
Figure 6B:
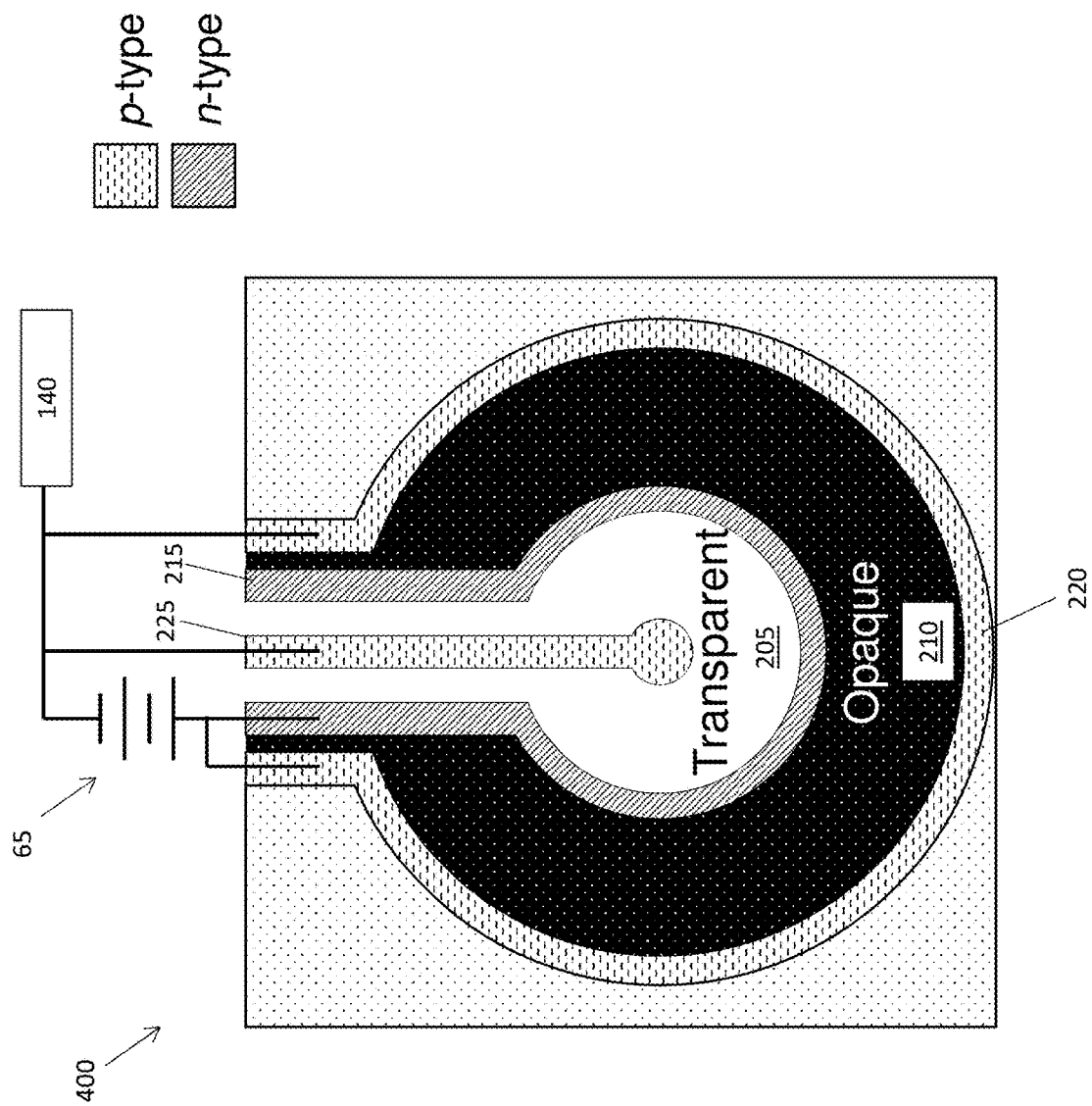
FIG. 6B is a top view of a solid-state electro-optic device operating as an aperture in a second state according to a non-limiting embodiment.

Turning now to FIGS. 6A and 6B, a solid-state electro-optic device 400 configured to operate as an electrically variable aperture is illustrated according to a non-limiting embodiment. The structure and profile of the solid-state electro-optic device 400 can be fabricated according to the semiconductor fabrication processes described in detail above, and therefore will not be repeated for the sake of brevity. In one or more embodiments, the contacts can be patterned to define various profiles including, but not limited to, a circular profile and a semi-circular profile.

The solid-state elector-optic device 400 includes a first annular contact 205 and a second annular contact 210. The first and second annular contacts 205 and 210 are formed from a transparent transitioning material to define the first and second transparent transitioning regions. In one or more embodiments, second annular contact 210 at least partially circumscribes the first annular contact 205. The solid-state electro-optic device 400 of FIGS. 6A and 6B can be used as a variable aperture, for example, by varying the area through which electromagnetic radiation can pass through the annular contacts 205 and 210 to a sensor. Using the principles described above, the annular contacts 205 and 210 can be set to separately (e.g., at different times or due to differing incident energy levels) be substantially transparent or substantially opaque to electromagnetic energy.

As shown in FIGS. 6A and 6B, the solid-state electro-optic device 400 includes not only annular contacts 205 and 210, but also a first electrical connector 215 that is connected to the n-type material layers and second and third electrical connectors 220 and 225, each of which is connected to respective sets of p-type material layers. Specifically, the second electrical connector 220 is connected to the p-type material layers of the second annular contact 210 and the third electrical connector 225 is connected to the p-type material layers of the first annular contact 205. The variable voltage source 65 is connected to each electrical connector 215, 220, and 225. The arrangement of annular contacts 205 and 210 with respect to the electrical connectors 215, 220 and 225 facilitates the ability to deplete the free carriers in response to applying a reverse DC voltage, which in turn induces transparency in the annular contacts 205 and 210. Although two annular contacts 205 and 210 are shown, it should be appreciated that additional structures and electrical connectors can be implemented. In this manner, the precision at which to modify the size and profile of the aperture can be increased and more selectively controlled.

The solid-state electro-optic device 400 can be controlled by a processor 140 in a similar manner as the device 100 described in detail above. In this example, however, the profile (e.g., size) of the aperture can be varied in response to different applied voltages. For example, FIG. 6A shows the solid-state electro-optic device 400 configured to operate as an aperture having a first size defined by the transparency of both annular contacts 205 and 210. When there is a desire for a smaller aperture as shown in FIG. 6B, processor 140 can cause the variable voltage source 65 to change the reverse bias voltage between the n-type and p-type material layers of the second annular contact 210 from the first reverse bias voltage to the second reverse bias voltage, where the second annular contact 210. As a result, the first annular contact 205 remains substantially transparent, while the second annular contact 210 is transitioned to substantially opaque. Accordingly, the smaller aperture is now defined by the remaining substantially transparent annular contact 205.

In one or more embodiments, the processor 140 can also cause the variable voltage source 65 to change the reverse bias voltage between the n-type and p-type material layers of the first annular contact 205, such as when directed laser energy is detected or when there is a risk of saturation, as described above. In addition, it should be clear that the processor 140 could cause variable voltage source 65 to change the reverse bias voltage between the n-type and p-type material layers of the first annular contact 205 but not the second annular contact 210. In this manner, the aperture would be defined by the remaining substantially transparent second annular contact 210 while the first annular contact 205 is transitioned to be substantially opaque.

Figure 7A:
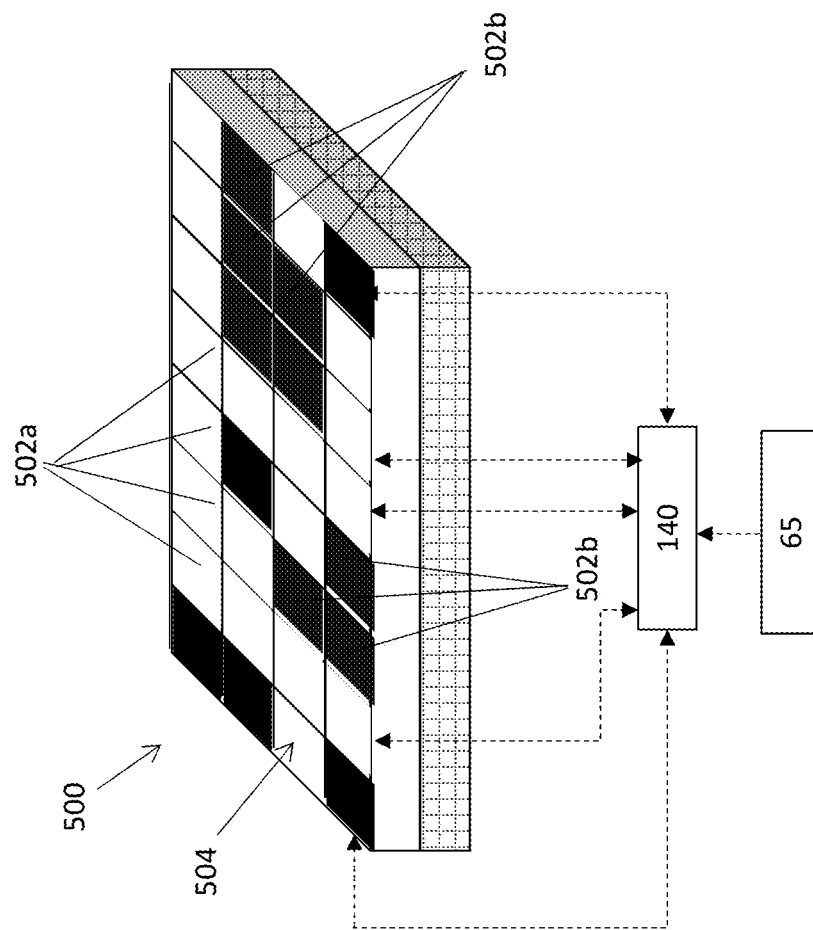
FIG. 7A illustrates a plurality of solid-state electro-optic devices arranged to form an optic grid and operating in response to first voltages to define a first pattern of a coded aperture according to a non-limiting embodiment.
Figure 7B:
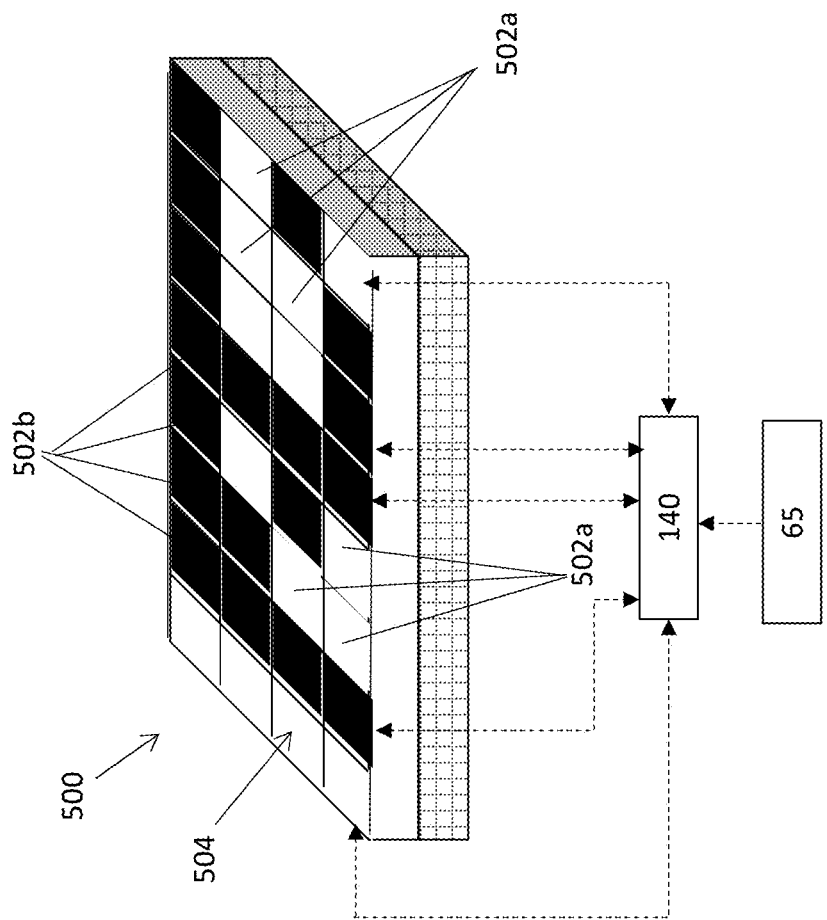
FIG. 7B illustrates a plurality of solid-state electro-optic devices arranged to form an optic grid and operating in response to second voltages to define a second pattern of the coded aperture according to a non-limiting embodiment.

Turning to FIGS. 7A and 7B, an image system 500 is illustrated including a plurality of individual solid-state electro-optic devices 502a and 502b is illustrated according to a non-limiting embodiment. The solid-state electro-optic devices 502a and 502b are arranged in in a plurality of columns and rows to form a grid 504. In one or more embodiments, each solid-state electro-optic device 502a and 502b is connected to power source 65 via processor 140. The processor 140 can control the voltage (e.g. voltage level, directional bias, etc.) applied to each individual solid-state electro-optic device 502a and 502b independently from one another. In this manner, the gird 504 of solid-state electro-optic devices 502a and 502b can be operated as a variable coded aperture, where the aperture code or pattern defined by the operating state (i.e., transparent state or opaque state) of the solid-state electro-optic devices 502a and 502b can be dynamically changed or reconfigured in real-time. In one or more non-limiting embodiments, the aperture code or pattern can have a size less than about $\lambda/5$-$\lambda/10$). In this manner, the grid 500 of solid-state electro-optic devices 502a and 502b can process sub-wavelength interactions such a, for example, differentiating polarization states.

Referring to FIG. 7A, for example, the gird 504 of solid-state electro-optic devices 502a and 502b is shown operating at a first time period (T1). During this first time period, the processor 140 applies a first voltage is applied to solid-state electro-optic devices 502a, while applying a second voltage is to solid-state electro-optic devices 502b. As described herein, the first voltage can be a reverse voltage bias with respect to the second voltage. Accordingly, solid-state electro-optic devices 502a are invoked into a substantially transparent state, while solid-state electro-optic devices 502b are invoked into a substantially opaque state. In this manner, the first pattern of substantially transparent solid-state electro-optic devices 502a and the substantially opaque solid-state electro-optic devices 502b defines a first coded aperture. As a result, light is passed through the optic grid 500 so as to generate a light pattern that is based on the pattern of the coded aperture.

Turning to FIG. 7B, the gird 504 of solid-state electro-optic devices 502a and 502b is shown operating at a second time period (T2). During this second time period, the controller 105 applies the first voltage to solid-state electro-optic devices 502a and applies the second voltage to solid-state electro-optic devices 502b. Accordingly, solid-state electro-optic devices 502a are invoked into a substantially transparent state and solid-state electro-optic devices 502b are invoked into a substantially opaque state, albeit at different locations of the grid 504 compared to time T1. In this manner, a different second pattern of substantially transparent solid-state electro-optic devices 502a and the substantially opaque solid-state electro-optic devices 502b is invoked, which defines a different second coded aperture. Accordingly, the pattern or code of the coded aperture can be dynamically changed or reconfigured in real-time to account for dynamically changing environments, applications, etc. The ability to dynamically change the pattern of the coded aperture allows for dynamically changing the light pattern generated by the light that passes through the optic grid 500. The ability to dynamically change or dynamically reconfigure the patterns in real-time also allows the grid 500 of solid-state electro-optic devices 502a and 502b to operate as a dynamic polarizer capable of dynamically varying transmission of one or more optical polarizations.

In one or more embodiments, the processor 140 can receive one or more inputs in real-time, and dynamically change or dynamically reconfigure the pattern of the coded aperture based on the input(s). The inputs include, but are not limited to, desired focus levels, desired input light, desired defection levels, desired image smoothing levels, and desired image sharpness levels. The inputs can also include signals provided by one or more sensors configured to detect various parameters in real-time. The parameters include, but are not limited to, light intensity, light energy levels, and wavelengths. The processor 140 can analyze the parameters indicated by the input sensor signals and/or compare the parameters to various threshold values. In this manner, the controller can adjust the voltages so as to dynamically change or reconfigure the patterns of the coded aperture in real-time in response to receiving the input sensor signals.

The input can also include a specific coding pattern selected by a user. In one or more embodiments, the controller 104 can be stored with predetermined patterns or aperture codings. In this manner, a user can select a particular application from a variety of pre-stored applications, and the controller 104 can dynamically apply the necessary voltages to the individual solid-state electro-optic devices 502a and 502b in order to invoke the stored pattern corresponding to the selected application.

Figure 8:
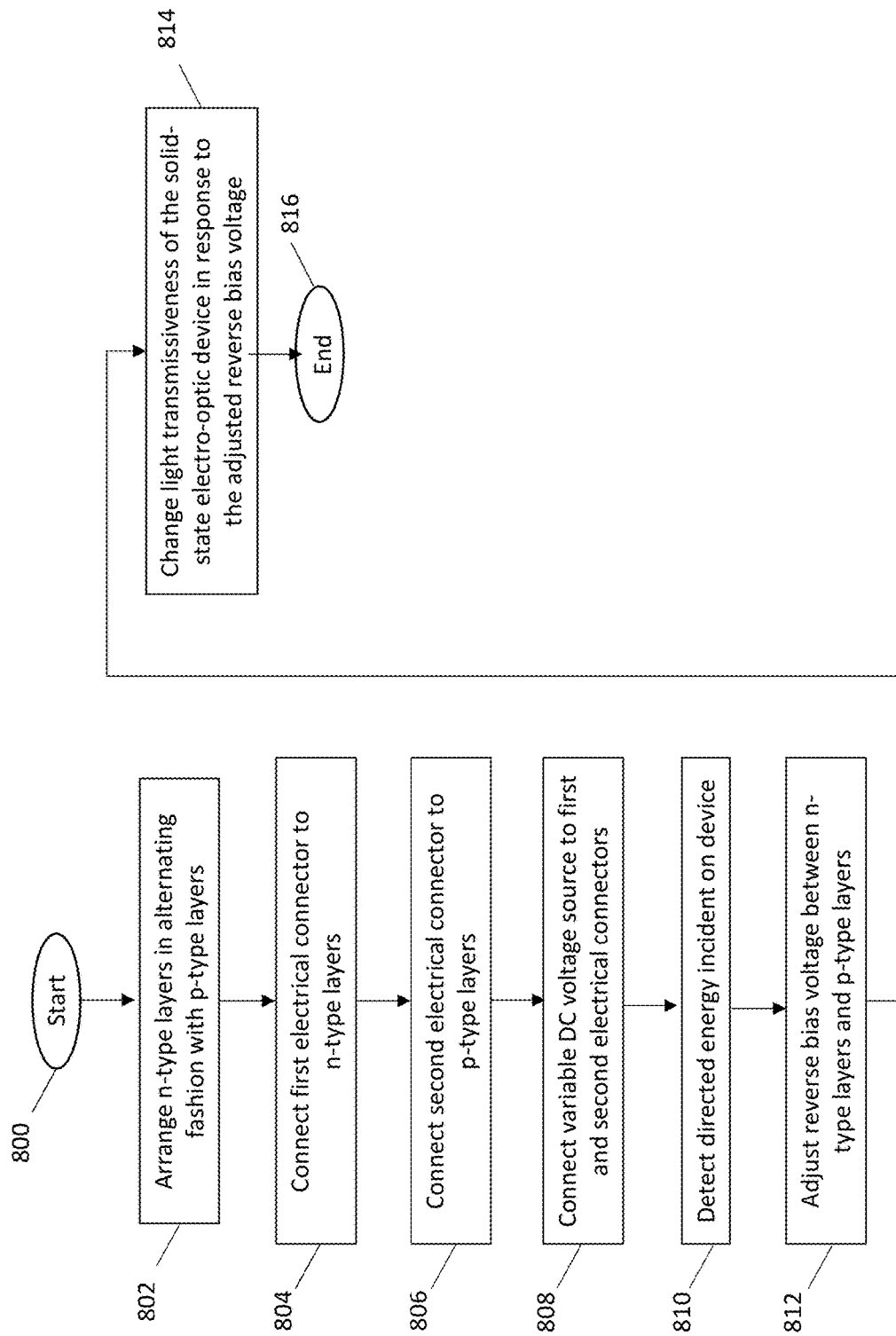
FIG. 8 is a flow diagram illustrating a method of operating a solid-state electro-optic device according to a non-limiting embodiment.

Referring now to FIG. 8, a method of operating a solid-state electro-optic device is illustrated according to a non-limiting embodiment. For simplicity, the method will be described in terms of the device 100 shown in FIGS. 1-4B. However, it should be understood that the method can also be used with device 400 shown in FIGS. 6A and 6B.

The method begins at operation 800, and at operation 802 a plurality of n-type material layers 15 are arranged in an alternating fashion with a plurality of p-type material layers 25. Adjacent layers are in electrical contact with each other so form a solid-state electro-optic device 100. At operation 804 a first electrical connector 35 is electrically connected to at least a portion of the n-type material layers 15, and at operation 806 a second electrical connector 45 is electrically connected to at least a portion of the p-type material layers 25. At operation 808, a variable voltage source 65 is electrically connected to the first and second electrical connectors 35 and 45, and a processor 140 is operatively connected to the variable voltage source 65. In this manner, the processor 140 can selectively apply different voltage levels and/or different voltage directions (e.g., forward bias or reverse bias) to the first and second electrical connectors 35 and 45.

At operation 810, directed energy incident on the solid-state electro-optic device 100 is detected. In one or more embodiments, a detector unit 215 can detect directed energy incident on the device 100 and can communicate the detection to the processor 140. In response to the signal indicating detection of the incident light, the processor 140 causes the variable voltage source 65 to adjust the reverse bias voltage between the n-type and p-type material layers 15 and 25 at operation 812. At operation 814, the transmissivity of the solid-state electro-optic device 100 is changed based on the adjusted reverse bias voltage, and the method ends at operation 816. For example, the variable voltage source 65 may change the reverse bias voltage from a first reverse bias voltage at which transmissivity is a maximum (i.e., the solid-state electro-optic device 100 is substantially transparent) to a second reverse bias voltage at which transmissivity is a minimum (i.e., the solid-state electro-optic device 100 is substantially opaque).

Figure 9:
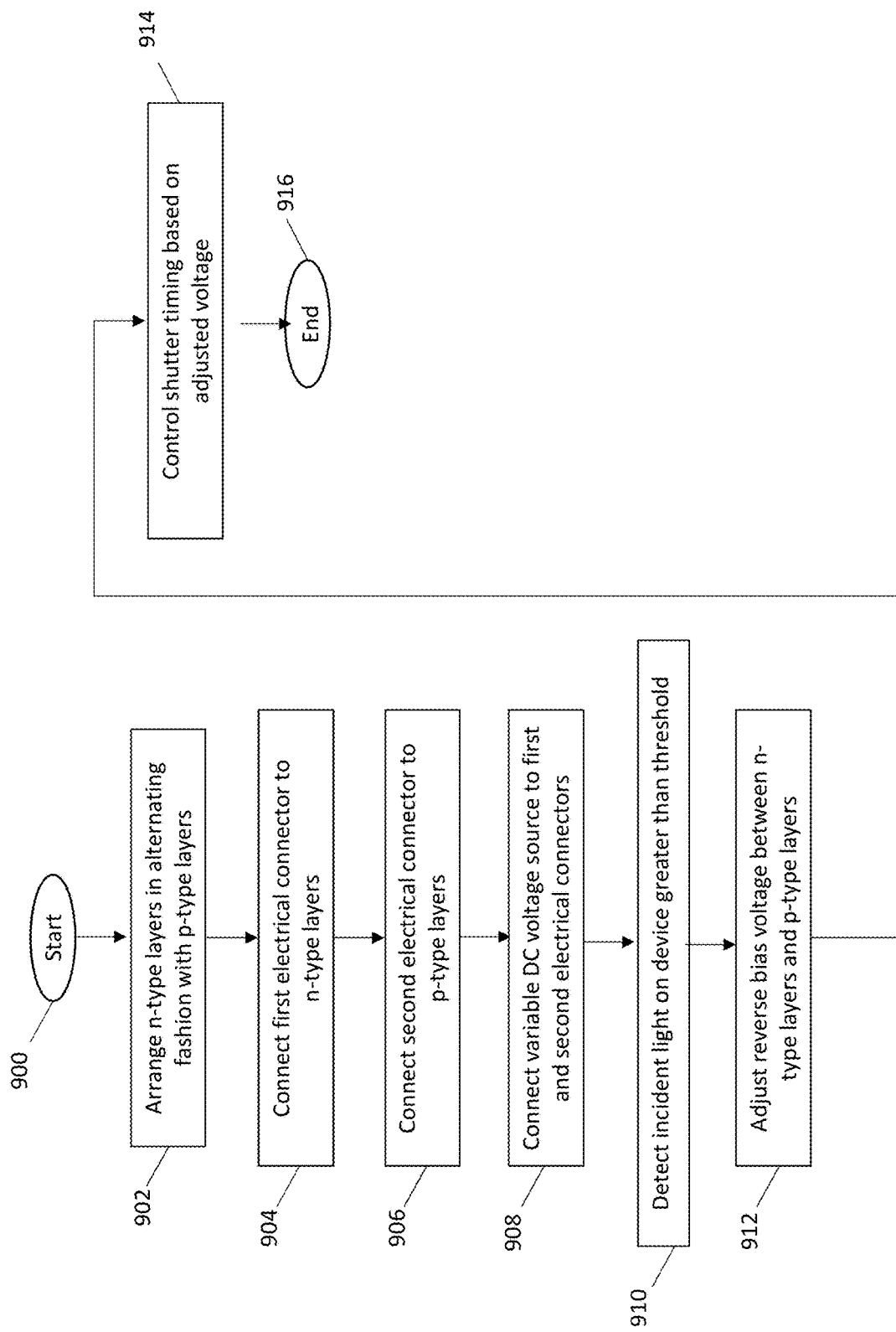
FIG. 9 is a flow diagram illustrating a method of operating a solid-state electro-optic device according to another non-limiting embodiment.

Referring to FIG. 9, a method of operating a solid-state electro-optic device is illustrated according to a non-limiting embodiment. As mentioned above, the method will be described in terms of the device 100 shown in FIGS. 1-4B for simplicity. However, it should be understood that the method can also be used with device 400 shown in FIGS. 6A and 6B.

The method begins at operation 900, and at operation 902 a plurality of n-type material layers 15 are arranged in an alternating fashion with a plurality of p-type material layers 25 such that adjacent layers are in electrical contact with each other to form a solid-state electro-optic device 100. At operation 904 a first electrical connector 35 is electrically connected to at least a portion of the n-type material layers 15, and at operation 906 a second electrical connector 45 is electrically connected to at least a portion of the p-type material layers 25. At operation 908 a variable voltage source 65 is electrically connected 408 to the first and second electrical connectors 35 and 45, and a processor or processor 140 is operatively connected to the variable voltage source 65. In this manner, the processor 140 can selectively apply different voltage levels and/or different voltage directions (e.g., forward bias or reverse bias) to the first and second electrical connectors 35 and 45.

At operation 910, the processor 140 or a focal plane array positioned adjacent the material layers 15, 25 detects that light incident on the solid-state electro-optic device 100 exceeds a threshold level on one or more pixels, which could result in saturation of the pixels and reduced performance. When the light incident on the pixels is greater than the threshold, the processor 140 causes the variable voltage source 65 to adjust the reverse bias voltage between the n-type and p-type material layers 15 and 25 at operation 912. Accordingly, a shutter timing of the solid-state electro-optic device 100 can be controlled based on the adjusted reverse voltage bias at operation 914, and the method ends at operation 916. Accordingly, the adjusted reverse bias is can be applied to between fully open and fully closed to let a certain amount of light through in a predetermined time interval.

In another embodiment, there may be a plurality of a solid-state electro-optic device 100, where each is associated with a respective pixel of the focal plane array. In such an embodiment, the processor 140 can determine one or more pixels that are most at risk of saturation by comparing the incident light level to the threshold. The processor 140 can then cause the variable voltage source 65 to adjust the reverse bias voltage between the n-type and p-type material layers 15 and 25 to change the transmissivity of the solid-state electro-optic device 100 associated with those pixels, but not the remaining a solid-state electro-optic devices 100.

Figure 10:
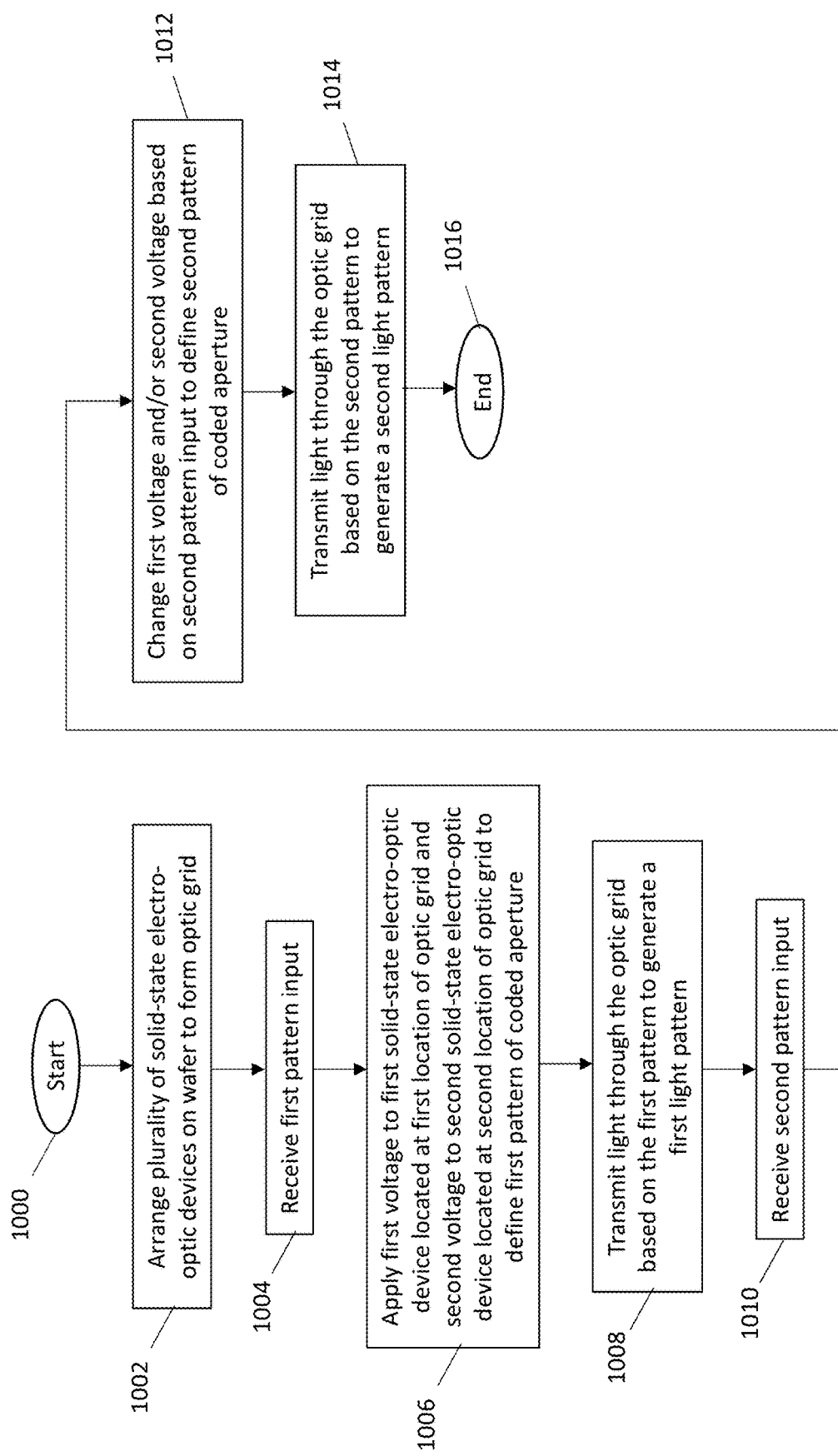
FIG. 10 is a flow diagram illustrating a method of operating a plurality of solid-state electro-optic devices according to a non-limiting embodiment.

Turning to FIG. 10, a method of operating a plurality of solid-state electro-optic devices is illustrated according to a non-limiting embodiment. The method begins at operation 1000, and at operation 1002 a plurality of solid-state electro-optic devices 100 are arranged on a wafer to form an optic grid. Operation for adjusting the light transmissivity of the solid-state electro-optic devices 100 based on different applied voltages are described in detail above, and therefore will not be repeated for sake of brevity. At operation 1004, a first pattern input is provided to a processor 140, which is in signal communication with each solid-state electro-optic device 100 included in the optic grid. The first pattern input can be manually input to the processor 140 and/or can be input as a signal output from one or more sensors. At operation 1006 a first voltage (e.g., voltage level and/or voltage bias direction) is applied to one or more solid-state electro-optic devices 100 located at a first position/region of the optic grid during a first period, and a second voltage (e.g., voltage level and/or voltage bias direction) is applied to one or more solid-state electro-optic devices 100 located at a second position/region of the optic grid during. The different voltages applied to the solid-state electro-optic devices 100 result in different transmissivity states at different regions of the optic grid to define a first pattern of the coded aperture. At operation 1008, light is delivered to the optic grid. Accordingly, the light is transmitted through the optic grid so as to generate a first light pattern that is defined by the first pattern.

Turning to operation 1010, a second pattern input is provided to a processor 140. The second pattern input can be manually input to the processor 140 and/or can be input as a signal output from one or more sensors. At operation 1012, the first voltage and/or second voltage is changed based on the second pattern input to the processor 140. Accordingly, the change in voltage(s) results in a change in the transmissivity states at one or more regions of the optic grid to define a second pattern of the coded aperture. At operation 1014, light is delivered to the optic grid and is transmitted through the optic grid. In this manner, a different second light pattern is generated based on the second pattern of the coded aperture, and the method ends at operation 1016.

As described herein, various non-limiting embodiments described herein utilize solid-state electro-optic devices to overcome limitations of known mechanical optical devices. In one or more non-limiting embodiments, the solid-state electro-optic devices described herein are operated in various manners to provide different electro-optic devices including, but not limited to an electrically switchable shutter, an electrically variable aperture, a dynamic image filter, a neutral density filter, an image modulator, and a polarizer. In one or more non-limiting embodiments, a plurality of the solid-state electro-optic devices can be arranged on a wafer, where the transmissivity of each solid-state electro-optic device is adjusted independent from one another. In this manner, various electro-optic devices including, but not limited to, a segmented shutter, a dynamically reconfigurable coded aperture, and a polarizer, can be provided which overcome the excessive size, weight and cost (SWa-C) limitations and operating response limitations found in known mechanical optical devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A solid-state electro-optic device with an electrically variable aperture, comprising:
    at least one superlattice semiconductor device including an alternating stack of first semiconductor layers having a first dopant and second semiconductor layers having a second dopant;
    wherein the alternating stack of the first semiconductor layers includes a patterned portion defining a first transparent transitioning region between a first pair of electrical connectors, and a second transparent transitioning region between a second pair of electrical connectors;
    wherein the first and second pairs of electrical connectors are configured to receive a first voltage to induce a first optical state of the first and second transparent transitioning regions such that a first amount of light is transmitted through the alternating stack; and
    wherein the first and second pairs of electrical connectors are configured to receive a second voltage to induce a second optical state to the first transparent transitioning region, while maintaining the first state of the second transparent transitioning region such that a second amount of light different from the first amount is transmitted through the alternating stack.

2. The solid-state electro-optic device of claim 1, wherein the first optical state is a transparent state and the second optical state is an opaque state such that the second amount of light is less than the first amount of light.

3. The solid-state electro-optic device of claim 1, wherein the first optical state is an opaque state and the second optical state is a transparent state such that the second amount of light is greater than the first amount of light.

4. The solid-state electro-optic device of claim 1, wherein the first semiconductor layers comprise a semiconductor material doped with a p-type dopant and the second semiconductor layers comprise a semiconductor material doped with an n-type dopant, and wherein the second pair of electrical connectors includes the second electrical connector and a third electrical connector connected to the first semiconductor layers.

5. The solid-state electro-optic device of claim 1, wherein the first semiconductor layers comprise a semiconductor material doped with an n-type dopant and the second semiconductor layers comprise a semiconductor material doped with a p-type dopant, and wherein the second pair of electrical connectors includes the second electrical connector and a third electrical connector connected to the first semiconductor layers.

6. The solid-state electro-optic device of claim 1, wherein the first and second transparent transitioning regions have circular profiles.

* * * * *